United States Patent
Kitayama et al.

(10) Patent No.: US 8,333,426 B2
(45) Date of Patent: Dec. 18, 2012

(54) RISE UP PANORAMIC ROOF FOR A VEHICLE

(75) Inventors: Kenichi Kitayama, Tochigi (JP); Michael A. Schrader, Allston, MA (US); Matthew Weyand Schmitt, Dublin, OH (US); Yoshitaka Higuchi, Tochigi (JP)

(73) Assignees: Honda Motor Co., Inc., Tokyo (JP); Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 13/198,131

(22) Filed: Aug. 4, 2011

(65) Prior Publication Data

US 2012/0032469 A1 Feb. 9, 2012

Related U.S. Application Data

(60) Provisional application No. 61/371,388, filed on Aug. 6, 2010.

(51) Int. Cl.
*B60J 7/00* (2006.01)

(52) U.S. Cl. .................... 296/216.02; 296/223

(58) Field of Classification Search ...... 296/216.01–224
See application file for complete search history.

(56) References Cited

U.S. PATENT DOCUMENTS

| | | | |
|---|---|---|---|
| 1,889,679 A | 11/1932 | Marin | |
| 2,086,091 A | 7/1937 | Payette | |
| 2,596,355 A | 5/1952 | Ackermans | |
| 2,997,336 A | 8/1961 | Huggins et al. | |
| 3,214,213 A * | 10/1965 | Hezler, Jr. et al. | 160/37 |
| 3,378,298 A | 4/1968 | Wingen | |
| 3,419,304 A | 12/1968 | Sangimino | |
| 4,272,121 A | 6/1981 | Kim | |
| 4,274,670 A | 6/1981 | Pitzmann | |
| 4,323,274 A | 4/1982 | Soderberg et al. | |
| 4,521,937 A * | 6/1985 | Fisher | 16/332 |
| 4,620,743 A | 11/1986 | Eke | |
| 4,659,136 A | 4/1987 | Martin et al. | |
| 4,707,014 A | 11/1987 | Rich | |
| 4,712,827 A | 12/1987 | Jensen | |

(Continued)

FOREIGN PATENT DOCUMENTS

DE 3523882 1/1987

(Continued)

OTHER PUBLICATIONS

Citroen C3 Pluriel—photographs 1 and 2; date unknown.

(Continued)

*Primary Examiner* — Dennis Pedder
(74) *Attorney, Agent, or Firm* — Rankin Hill & Clark LLP

(57) ABSTRACT

A rise-up panoramic roof provided on a roof opening of a body of a vehicle comprises a frame member and a lift assembly. The frame member has a forward portion and a rear portion. The forward portion is hingedly connected to the vehicle body such that the frame member does not slide relative to the body. The frame member is configured to hold a roof panel. The lift assembly is configured to move the frame member between a closed position where the rear portion of the frame member closes the opening of the vehicle body and a raised, open position where the frame member is raised from the vehicle body and the rear portion is located above the opening.

19 Claims, 7 Drawing Sheets

U.S. PATENT DOCUMENTS

| | | | |
|---|---|---|---|
| 4,830,428 A * | 5/1989 | Masuda et al. | 296/219 |
| 5,183,310 A | 2/1993 | Shaughnessy | |
| 5,294,170 A | 3/1994 | Hsueh | |
| 5,921,611 A | 7/1999 | Townsend | |
| 5,997,072 A | 12/1999 | Parkinson | |
| 6,007,139 A | 12/1999 | Shave | |
| 6,241,302 B1 | 6/2001 | Rehkopf | |
| 6,305,740 B1 | 10/2001 | Staser et al. | |
| 6,447,050 B1 | 9/2002 | Plassmeyer et al. | |
| 6,485,094 B2 | 11/2002 | Courder et al. | |
| 6,494,528 B2 | 12/2002 | Tolinski et al. | |
| 6,505,878 B1 | 1/2003 | Mascolo | |
| 6,695,377 B2 | 2/2004 | Paiva et al. | |
| 6,729,684 B2 | 5/2004 | Arnold et al. | |
| 6,789,830 B2 | 9/2004 | Van Bussel | |
| 6,874,838 B2 | 4/2005 | De Gaillard | |
| 7,029,058 B2 | 4/2006 | Mathew | |
| 7,032,962 B2 | 4/2006 | Engelgau et al. | |
| 7,125,070 B2 | 10/2006 | Sawada et al. | |
| 7,140,657 B2 | 11/2006 | Cuma | |
| 7,334,833 B2 | 2/2008 | Koelbl et al. | |
| 7,344,180 B2 | 3/2008 | Halbweiss et al. | |
| 7,354,095 B2 | 4/2008 | Fleming et al. | |
| 7,404,598 B2 * | 7/2008 | Huebner et al. | 296/216.09 |
| 7,438,342 B2 | 10/2008 | Greenwood | |
| 7,494,175 B2 | 2/2009 | Condon et al. | |
| 7,651,148 B2 | 1/2010 | Hustyi et al. | |
| 2005/0253406 A1 | 11/2005 | Faubert et al. | |
| 2007/0210623 A1 | 9/2007 | Becher et al. | |
| 2008/0315632 A1 | 12/2008 | Righetti | |

FOREIGN PATENT DOCUMENTS

| | | |
|---|---|---|
| DE | 19513520 | 8/1996 |
| EP | 0284400 | 9/1988 |
| JP | 62210124 | 9/1987 |
| JP | 1289773 | 11/1989 |

OTHER PUBLICATIONS

Renault Be-Bop—photographs 1 and 2; 2003.
GMC Envoy XUV—photograph 1; date unknown.
Webasto Welcome Concept—photograph 1; 2002.
Studebaker Wagonaire—photograph 1; date unknown.
U.S. Appl. No. 12/851,897, filed Aug. 6, 2010, Titled "Spoiler for Rear Hatch Closure Assembly".
U.S. Appl. No. 12/851,899, filed Aug. 6, 2010, Titled "Slide Hatch Assembly".
U.S. Appl. No. 12/851,813, filed Aug. 6, 2010, Titled "Dual Action Rear Hatch".
Office Action of U.S. Appl. No. 12/851,813 dated Oct. 27, 2011.
Office Action of U.S. Appl. No. 12/851,813 dated Jul. 18, 2011.
Office Action of U.S. Appl. No. 12/851,899 dated Jul. 19, 2011.
Motorsnaps.com, http://www.motorsnaps.com/d/28353-3/2002+Webasto++Welcome.jpg.
U.S. Appl. No. 12/851,889, filed Aug. 6, 2010, Titled "Closure Assembly for Vehicle".
Office Action of U.S. Appl. No. 12/851,889 dated Nov. 1, 2011.
Office Action of U.S. Appl. No. 12/851,889 dated Jul. 19, 2011.

* cited by examiner

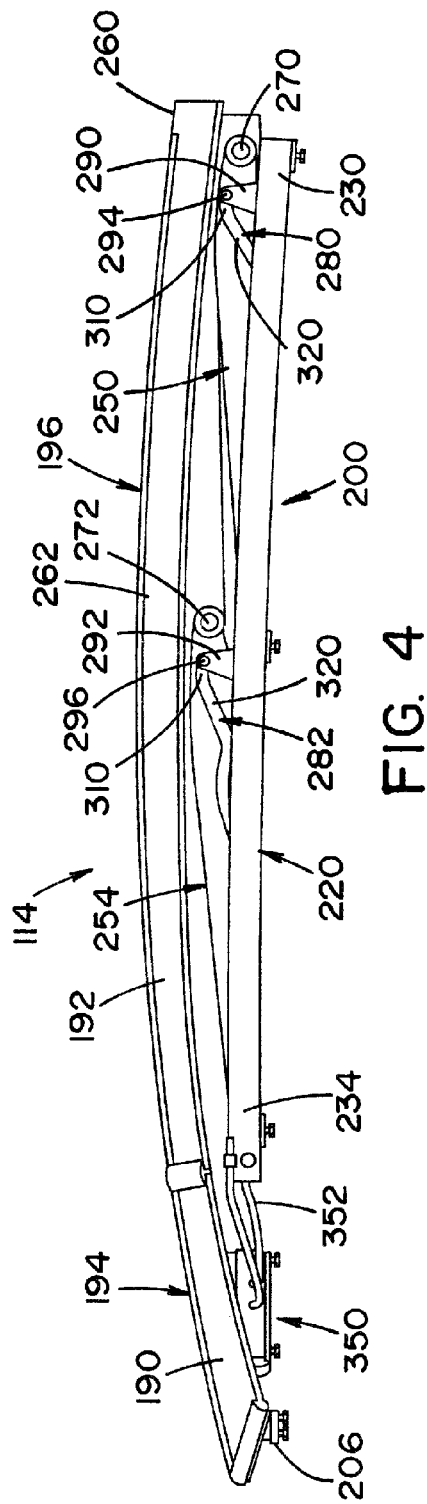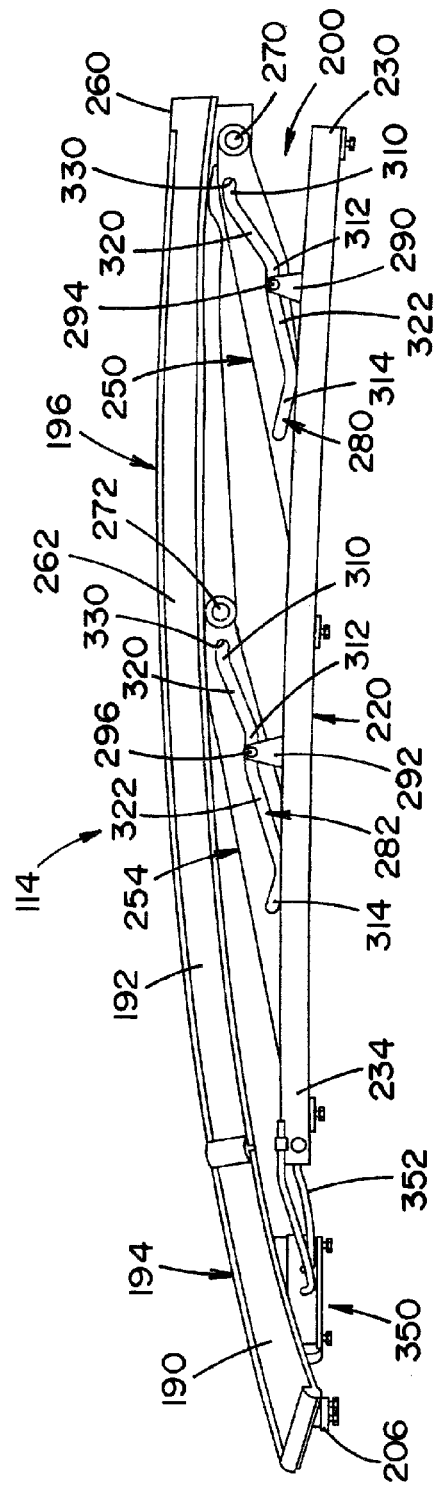

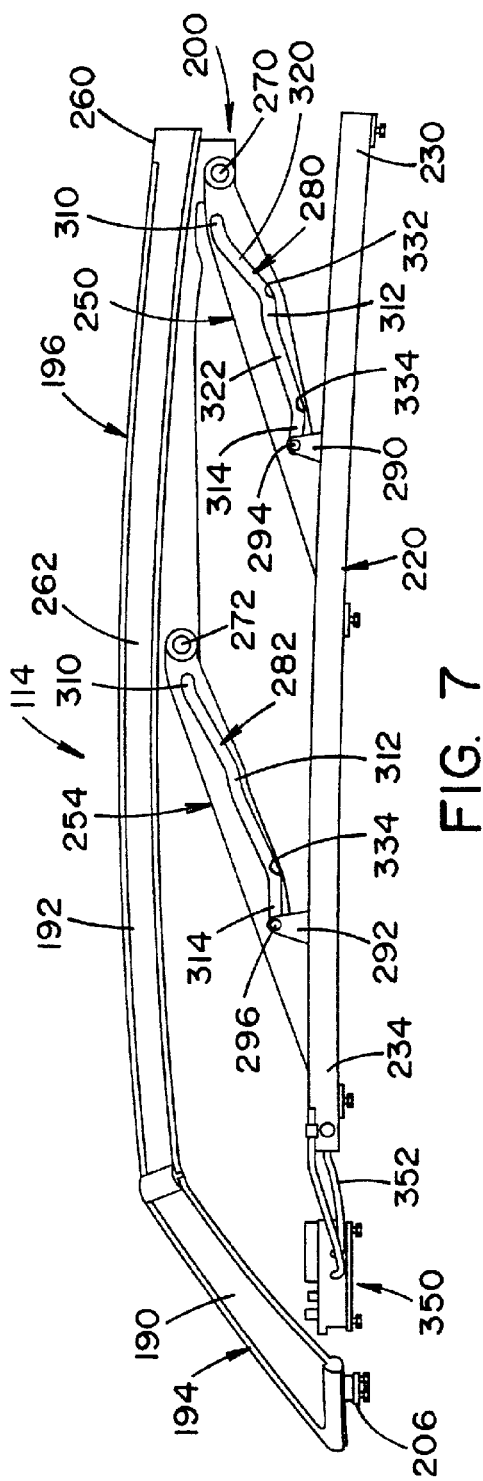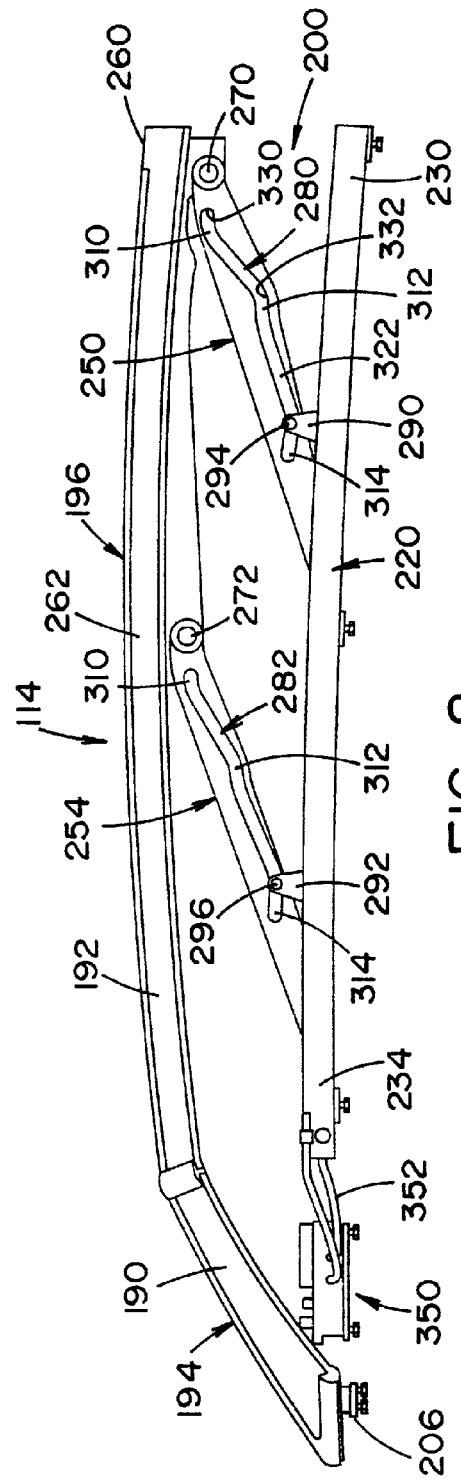

RISE UP PANORAMIC ROOF FOR A VEHICLE

CROSS-REFERENCE TO RELATED APPLICATIONS

The present application claims priority to U.S. Provisional Patent Application Ser. No. 61/371,388, filed Aug. 6, 2010, the disclosure of which being incorporated in its entirety herein.

BACKGROUND

Exemplary embodiments herein generally relate to a vehicle roof, and more particularly to a rise-up, two-panel panoramic roof for a vehicle that is configured to lift or raise up into various open positions rather than sliding back.

Currently, there are several different versions of a panoramic roof assembly for a vehicle, and typically, there are two different options in terms of functionality. The first option has a fixed main glass panel which serves only to allow more light into the passenger cabin. The second option is a tilt and slide roof system. With this tilt and slide system, the main glass panel can either be tilted up for ventilation or be slid rearward over/under a body structure to provide for an open feeling. Neither known option is configured to allow a separate sliding panel member, such as a sliding rear hatch of the vehicle, to slide underneath the main glass panel in a slide open position.

BRIEF DESCRIPTION

In accordance with one aspect, a rise-up panoramic roof provided on a roof opening of a body of a vehicle comprises a frame member and a lift assembly. The frame member has a forward portion and a rear portion. The forward portion is hingedly connected to the vehicle body such that the frame member does not slide relative to the vehicle body. The frame member is configured to hold a roof panel. The lift assembly is configured to move the frame member between a closed position where the rear portion of the frame member closes the opening of the vehicle body and a raised, open position where the frame member is raised from the vehicle body and the rear portion is located above the opening.

In accordance with another aspect, a rise-up panoramic roof provided on an opening of a vehicle body comprises a forward frame member and a rear frame member. The forward frame member is hingedly connected to the vehicle body and configured to hold a forward roof panel. The rear frame member is hingedly connected to the forward frame member and is configured to hold a rear roof panel. A lift assembly is configured to move both the forward frame member and rear frame member between a closed position in which the rear frame member closes the opening of the vehicle body and an open position in which the rear frame member is displaced from the vehicle body. The lift assembly includes a pair guide rails secured to the body along lateral edges defining the roof opening. A drive carriage is slidably received in each guide rail. A first lift arm has one end portion articulated on the drive carriage and the other end portion articulated on a rear portion of the rear frame member. A second lift arm has one end portion articulated on the drive carriage and the other end portion articulated on a central portion of the rear frame member. The first and second lift arms are configured to move the forward and rear frame members as the drive carriages are displaced toward a forward portion of the guide rails in the direction of travel of the vehicle.

In accordance with yet another aspect, a vehicle having a roof opening selectively closed by a rise-up panoramic roof comprises a vehicle body structure defining the roof opening. A forward frame member is hingedly connected to the vehicle body structure and configured to hold a forward roof panel. A rear frame member is hingedly connected to the forward frame member and configured to hold a rear roof panel. A lift assembly is configured to move both the forward frame member and rear frame member between a closed position, a tilt position and an open position in which the rear frame member is vertically raised from the vehicle body structure. The lift assembly includes a drive carriage slidably mounted to the vehicle body structure along lateral edges defining the roof opening, and a first lift arm and a second lift arm for each drive carriage. Each lift arm has one end portion articulated on the drive carriage and the other end portion articulated on the rear frame member. The first and second lift arms are configured to raise the forward and rear frame members as the drive carriages are displaced in the direction of travel of the vehicle. Each of the first and second lift arms includes an elongated cam slot and each drive carriage includes first and second guide pins which engage the cam slots of the respective first and second lift arms. The lift assembly, together with the hinged connection of the forward frame member to the rear frame member, defines a five-bar linkage on each lateral side of the panoramic roof which provides stability for the panoramic roof in a raised position.

BRIEF DESCRIPTION OF THE DRAWINGS

FIG. 4 is a schematic view of the panoramic roof assembly of FIG. 2 in a closed position.

FIG. 5 is a schematic view of the panoramic roof assembly of FIG. 2 in a tilt open position.

FIG. 7 is a schematic view of the panoramic roof assembly of FIG. 2 in a full-open position.

FIG. 8 is a schematic view of the panoramic roof assembly of FIG. 2 in a final-open position.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary rise-up panoramic roof assembly disclosed herein are merely terms of art that may vary from one manufacturer to another and should not be deemed to limit the present disclosure.

Figure 1:
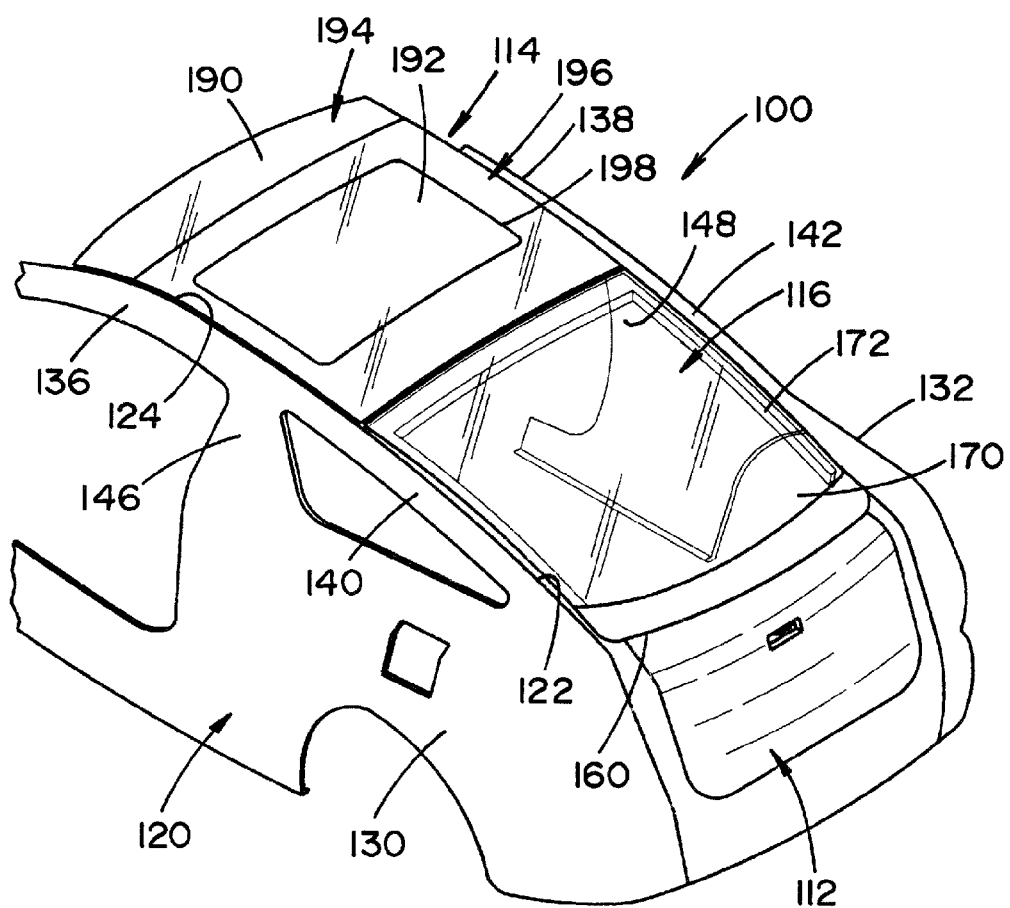
FIG. 1 is a schematic perspective view of a coupe-type hatchback vehicle having a drop-down tailgate, a panoramic roof assembly, and a dual-action rear hatch, all shown in respective closed positions.

Referring now to the drawings, wherein like numerals refer to like parts throughout the several views, FIG. 1 illustrates a vehicle 100 having a tailgate 112, a rise-up panoramic roof assembly 114 and a rear hatch 116, also referred to herein as a a slide hatch assembly. As shown, the vehicle 100 can be a coupe-type vehicle and/or a hatchback vehicle. More particularly, the vehicle 100 has a vehicle body 120 that defines a cargo opening 122 and a roof opening 124 between a pair of laterally spaced apart panel members 130, 132. The panel members 130,132 include roof support members, such as forward roof support members or forward roof rails 136, 138 and rearward roof support members or rearward roof rails 140, 142. The forward and rearward roof rails can extend from, for example, C-pillars 146,148 of the vehicle body 120.

Figure 9:
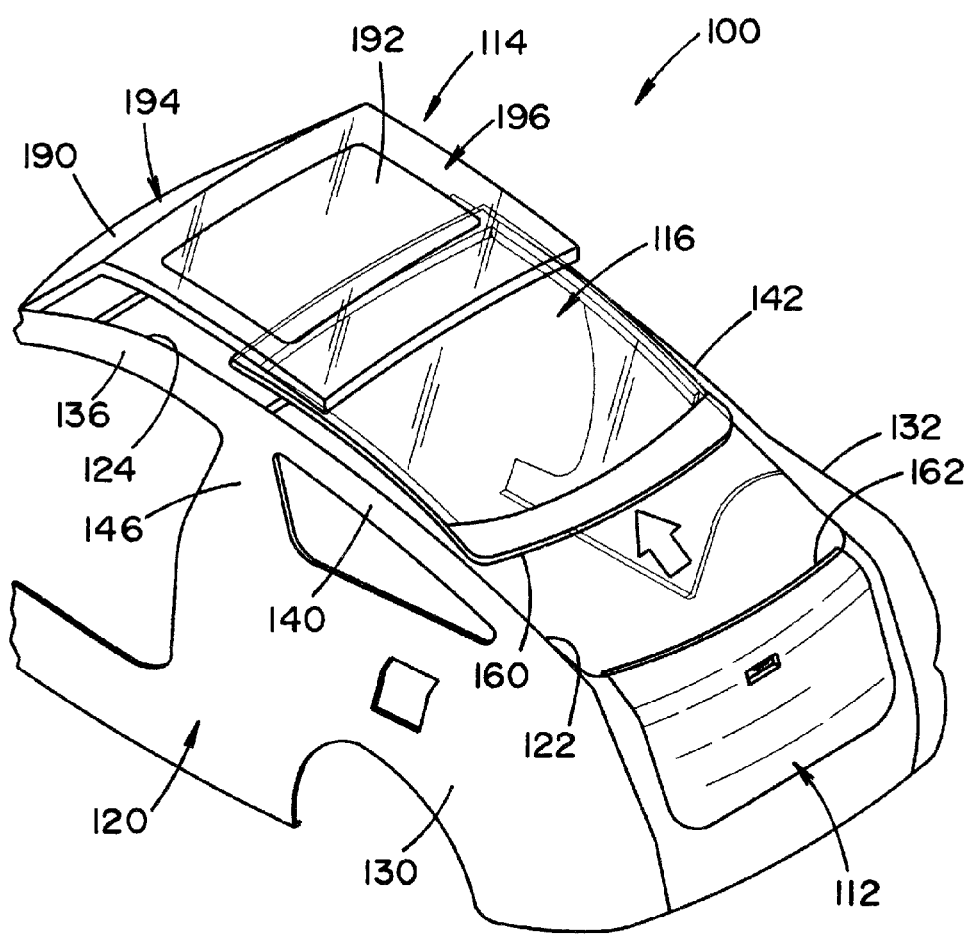
FIG. 9 is yet another schematic perspective view of the vehicle of FIG. 1 shown with the tailgate in the closed position, the panoramic roof assembly in the full-open position and the rear hatch moving toward a slide open position under the panoramic roof assembly.

The tailgate 112 extends across the rear portion of the vehicle body 120 (the rear portion defined by corner portions of the panel members 130,132) for selectively closing a rear portion of the cargo opening 122. The tailgate 112 can be a drop-down or flip-down tailgate and is windowless, though these are not required. The sliding hatch 116 extends across the vehicle body 120 forward of the tailgate 112 for selectively closing a forward portion of the cargo opening 122. The sliding hatch 116 extends laterally between the panel members 130,132 of the vehicle body 120 and extends longitudinally from the C-pillars 146,148 of the vehicle body 120 to an upper edge of the tailgate 112 of the vehicle. As shown in FIG. 1, a rearward edge 160 of the hatch 116 mates against an upper edge 162 (FIG. 9) of the tailgate 112 when the tailgate and the hatch are each in respective closed positions. The sliding hatch 116 is slidable from the closed position shown in FIG. 1 to the slide open position shown at least partially in FIG. 9 for opening the forward portion of the cargo opening 122. The hatch 116 can also have a flip-open mode wherein the rear hatch is flipped-open while in the slide closed position. This also provides access through the forward portion of the cargo opening 122. Sliding of the hatch 116 can be facilitated by rollers (not shown) mounted to the hatch 116 that are received within tracks (not shown) mounted to the vehicle body 120. Pivoted opening of the hatch 116 can be facilitated by hinges (not shown) that pivotally mount a hatch closure 170 to a hatch frame 172.

Figure 2:
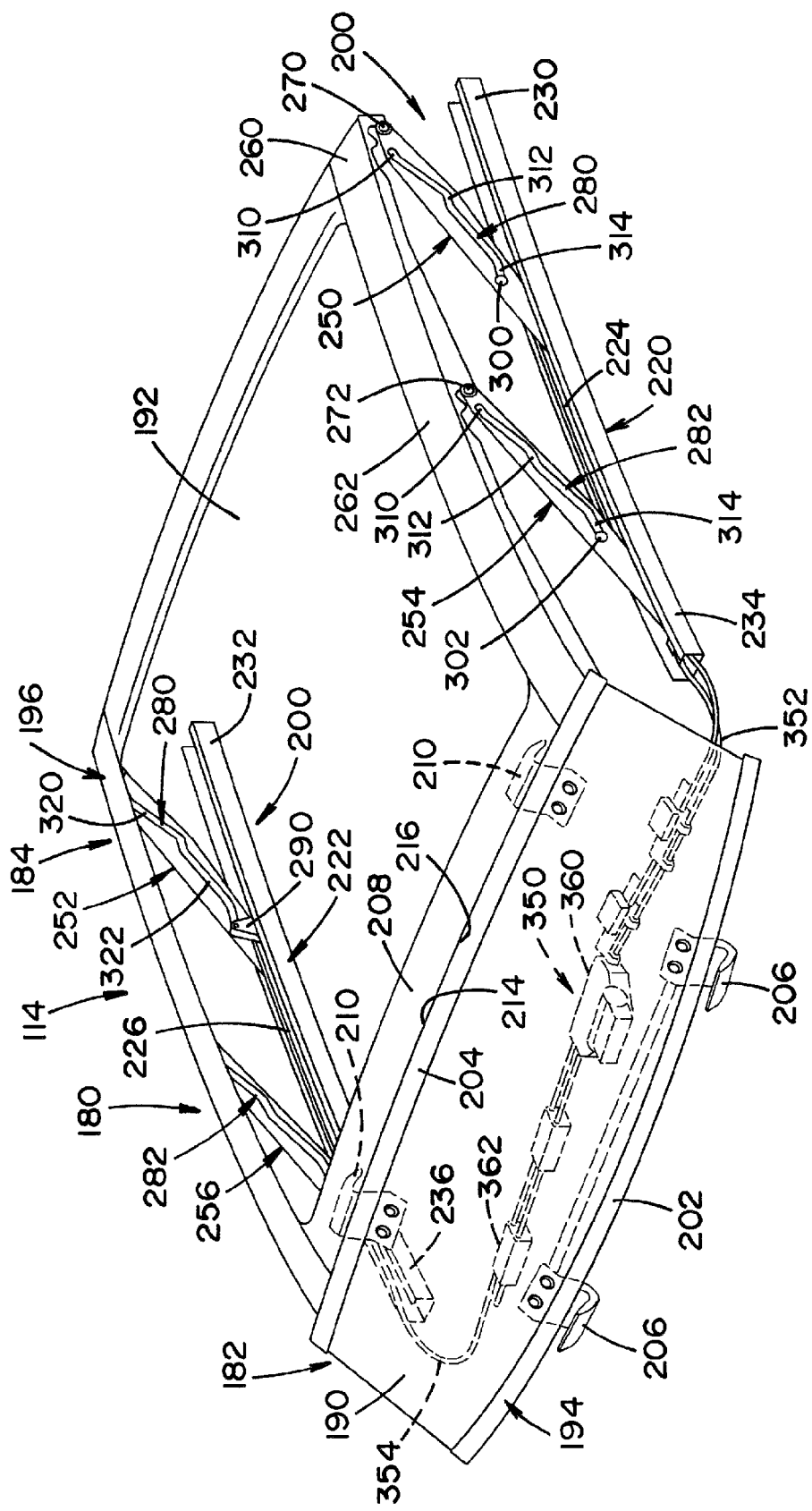
FIG. 2 is a schematic perspective view of the panoramic roof assembly of FIG. 1.

With continued reference to FIGS. 1 and 2, the rise-up panoramic roof assembly 114 is provided on the roof opening 124 and includes a frame member 180 having a forward portion 182 and a rear portion 184. As will be described in greater detail below, the forward portion 182 is hingedly connected to the vehicle body 120 such that the frame member 180 does not slide relative to the body 120. The frame member 180 is configured to hold a forward roof panel 190 and a rear roof panel 192. In the illustrated embodiment, each of the roof panels 190,192 is a rigid panel. For example, the panels 190,192 can be generally formed by a glass panel (or some other transparent material) and can be supported on the frame member 180. A lift assembly 200 is configured to move the frame member 180 between a closed position where the rear portion 184 of the frame member 180 substantially closes the roof opening 124 of the vehicle body 120 and a raised, open position where the frame member 180 is raised from the vehicle body 120 and the rear portion 184 is located above the roof opening 124.

In the depicted exemplary embodiment, the frame member 180 includes a forward frame member 194 and a rear frame member 196. The forward frame member 194 is hingedly connected to the vehicle body 120 and configured to hold the forward roof panel 190. The forward frame member 194 together with the forward roof panel 190 defines a raisable wind deflector arranged in front of the roof opening 124 in the direction of travel of the vehicle. The rear frame member 196 is hingedly connected to the forward frame member 194 and configured to hold the rear roof panel 192. Particularly, the forward frame member 194 includes a forward transverse frame part 202 and a rear transverse frame part 204. At least one first hinge member 206 is connected to the forward transverse frame part 202 for hingedly connecting a forward portion of the forward frame member 194 to the vehicle body 120. The rear frame member 196 includes a forward transverse frame part 208. At least one second hinge member 210 is connected to the transverse frame part 208 for hingedly connecting a rear portion of the forward frame member 194 to a forward portion of the rear frame member 196. In the depicted embodiment, a pair of spaced apart first hinge members 206 and a pair of spaced apart second hinge members 210 are provided. Although, it should be appreciated that alternative manners for hingedly connected the forward and rear frame members 194,196 are contemplated.

Seals can be provided on the panels 190,192 for sealing with the vehicle body 120 and/or the rear hatch 116. For example, seal 198 can be provided on an underside of the roof panel 192 for sealing against an upwardly facing surface on the vehicle body 120, such as a rim or gutter surrounding a roof opening (not shown), in the closed position of the panoramic roof assembly 114. The seal 198 is generally positioned along transverse and lateral edges of rear frame member 196.

The panoramic roof assembly 114 can have a plurality of positions including the closed position (shown in FIGS. 1 and 4) and one or more raised positions, such as a tilt open position (shown in FIG. 5), a full-open position (shown in FIGS. 3, 7 and 9), and a raised, final-open position (shown in FIG. 8). As indicated above, in the illustrated embodiment, the roof assembly 114 is a dual-panel assembly including the forward roof panel 190 and the rear roof panel 192 hingedly connected to the forward roof panel 190 along adjacent edges 214,216 of the respective forward and rear frame members 194,196. The roof assembly 114, including the panels 190, 192, is disposed forward of the rear hatch 116 on the vehicle body 120. As will be described in more detail below, the rear roof panel 192 is movable from the closed position to one or more of its raised positions for accommodating the sliding rear hatch 116 below the rear roof panel 192.

Figure 3:
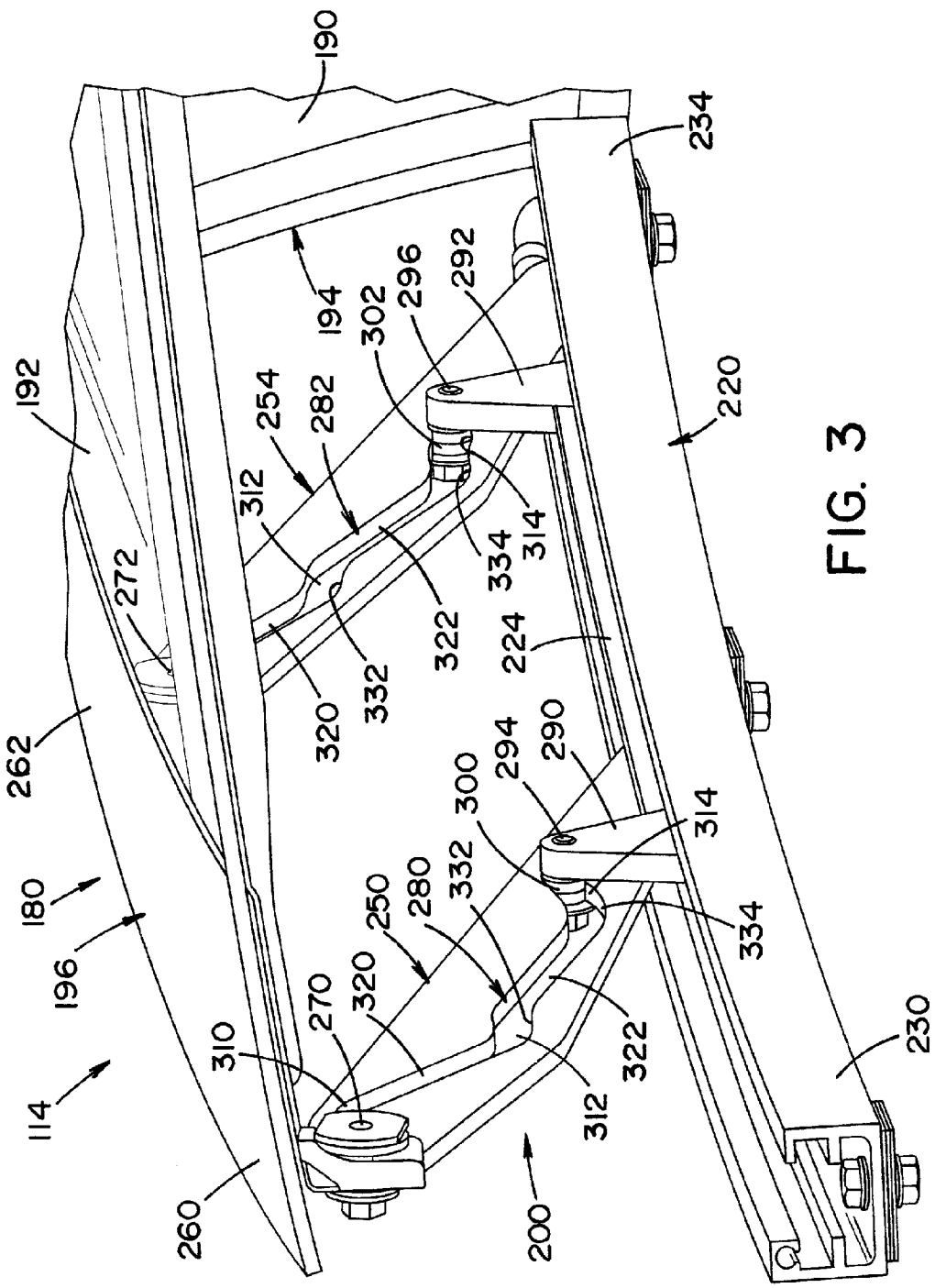
FIG. 3 is an enlarged, partial schematic view of a lift assembly of the panoramic roof assembly of FIG. 2.

The lift assembly 200 is configured to move both the forward frame member 194 and rear frame member 196 between the closed position in which the rear frame member 196 substantially closes the opening 124 of the vehicle body 120 and one of the open positions in which the rear frame member 196 is displaced from the vehicle body 120. With particular reference to FIGS. 2 and 3, the exemplary lift assembly 200 includes a pair of laterally spaced apart guide rails 220,222 connected to the body 120 and flanking the roof opening 124. Each guide rail 220,222 is generally U-shaped in cross-section and slidably receives a roller or drive carriage 224,226. In the depicted exemplary embodiment, each drive carriage 224, 226 is movable in the direction of travel of the vehicle to one or more positions for raising the roof assembly 114. More particularly, and as shown in FIGS. 4, 5 and 8 (which only depict operational positions of drive carriage 224), each drive carriage 224,226 moves from a first position (FIG. 4), where each drive carriage 224,226 is located at a rearward end portion 230,232 of the guide rails 220,222, to a second position (FIG. 5), where each drive carriage 224,226 is generally centrally located in each guide rail 220,222, and to a third position (FIG. 8), where each drive carriage 224,226 is located at a forward end portion 234,236 of the guide rails 220,222. It should be appreciated that this arrangement can be reversed so that the drive carriages 224,226 are moveable toward a rear portion of the guide rails 220, 222 in the opposite direction of travel of the vehicle. With this arrangement, the drive carriages are displaced from a first position located at the forward end portions 234,236, to the same second position described above, and to a third position located at the rearward end portions 230,232. As will be described in greater detail below, each of the first, second and third positions of the drive carriages 224,226 corresponds to one of the operational positions of the panoramic roof assembly 114.

With reference again to FIGS. 2 and 3, the lift assembly 200 further includes at least one lift arm operably connected to each drive carriage 224,226 and the frame member 180, the at least one lift arm being configured to raise the frame member 180 as each drive carriage slides within each guide rail 220, 222. In the depicted exemplary embodiment, the at least one lift arm includes a first lift arm 250,252 and a second lift arm 254,256. As shown, each first lift arm 250,252 has one end portion articulated on the respective drive carriage 224,226 and the other end portion articulated on a rear portion 260 of the rear frame member 196. Similarly, each second lift arm 254,256 has one end portion articulated on the respective drive carriage 224,226 and the other end portion articulated on a generally central portion 262 of the rear frame member 196. The articulation of the first arms 250,252 and the second arms 254,256 can be by way of a hinge, such as hinges 270,272 which connect the first and second arms to the rear frame member 196. With this configuration of the first lift arms 250,252 and second lift arms 254,256, the lift assembly 200, together with the hinged connection of the forward frame member 194 to the rear frame member 196, defines a five-bar linkage on each lateral side of the frame member 180 which provides stability in the raised position.

In the vehicle longitudinal direction, the lift assembly 200 is of symmetrical design on each of the lateral sides of the vehicle body 120, so that only one side of the panoramic roof assembly 114 will be described in detail. With particular reference to FIG. 3, each of the first and second lift arms 250,254 includes an elongated cam slot 280,282, which extends substantially along the entire longitudinal extent of the respective lift arm 250,254. The drive carriage 224 includes first and second guides 290,292, each having a guide pin 294,296 which engages the cam slots 280,282 of the respective first and second lift arms 250,254. As shown, the guide pins 294,296 can be provided with roller members 300,302 which allow the guide pins to easy move within the cam slots 280,282. Movement of the first and second guide pins 294,296 within the cam slots 280,282 of the respective first and second link arms 250,254 moves the frame member 180 between the closed position (FIG. 4) and one of the raised, open positions (FIGS. 5, 7 and 8).

Each cam slot 280,282 of the first and second lift arms 250,254 includes a first guide pin position area 310, a second guide pin position area 312, and a third guide pin position area 314. Each guide pin position area 310,312,314 extends generally parallel to the guide rails 220,222. This orientation of the guide pin position areas is generally maintained as the panoramic roof assembly 114 is moved between its operational positions. A first area 320 spans between the first guide pin position area 310 and the second guide pin position area 312. A second area 322 spans between the second guide pin position area 312 and the third guide pin position area 314. As depicted, the first and second areas 320,322 are generally straight; although, the first and second areas can be curved or have other shapes. The first and second areas 320,322 are generally inclined relative to the orientation of the first, second and third guide pin position areas 310,312,314. Stated another way, the first and second areas 320,322 extend along the longitudinal extent of each lift arm 250,254. As will be discussed in greater detail below, each guide pin position area 310,312,314 defines an operational position of the frame member 180 (i.e., the forward and rear frame members 194, 196) relative to the vehicle body 120. In the illustrated embodiment, each guide pin position area 310,312,314 is configured to at least partially retain therein the guide pin 294,296. Particularly, each guide pin position area 310,312, 314 can include a detent 330,332,334 (see FIGS. 3 and 5) dimensioned to allow the guide pins 294,296 to sit within the guide pin position area. This provides additional stability to the lift assembly 200 as the panoramic roof assembly 114 is in one of the raised, open positions.

Figure 6:
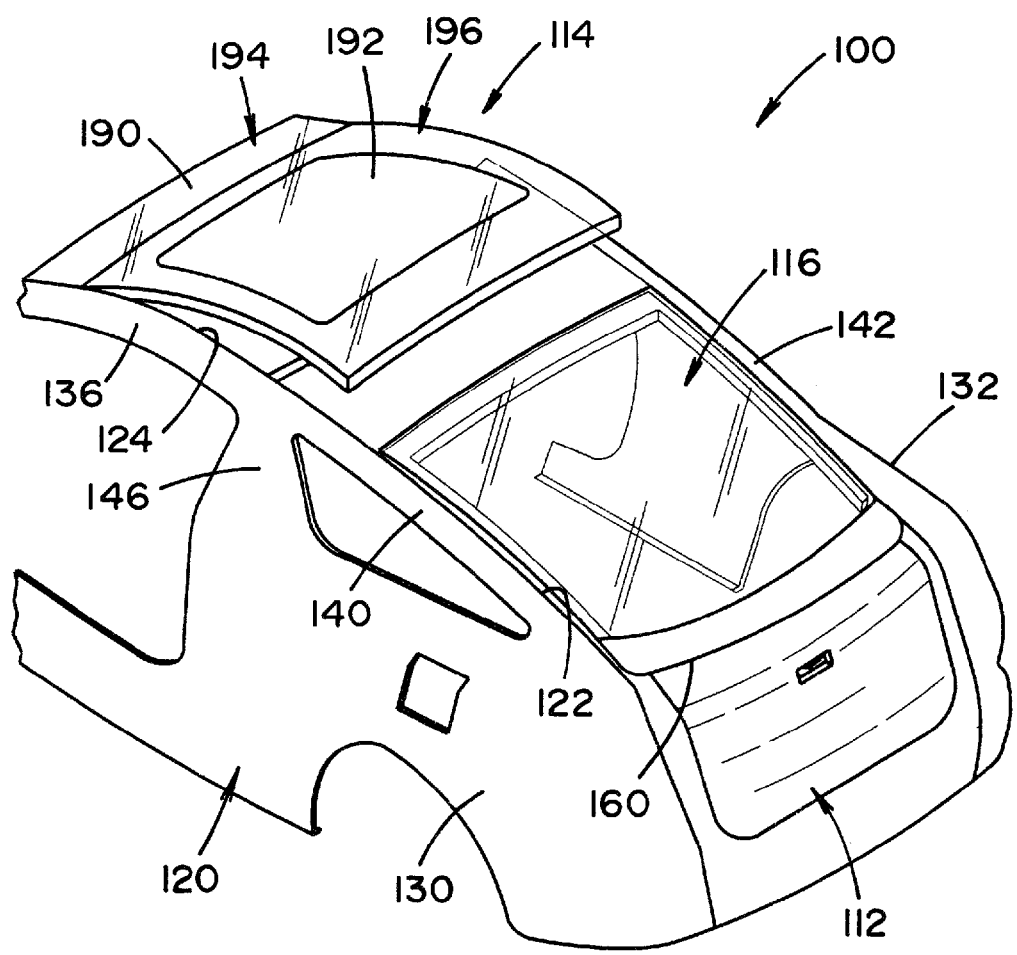
FIG. 6 is another schematic perspective view of the vehicle of FIG. 1 shown with the tailgate in the closed position, the panoramic roof assembly in the tilt open position and the rear hatch in the slide closed position.

As shown in FIG. 4, in the closed position of the panoramic roof assembly 114, the drive carriage (not visible) is in the first position (i.e., is located at the rearward end portion 230 of the guide rail 220). The first and second arms 250,254 are slightly canted relative to the guide rail 220, and the guide pins 294,296 are positioned in the first guide pin position area 310. As shown in FIGS. 5 and 6, in the tilt open position of the panoramic roof assembly 114, the drive carriage is moved in the direction of travel of the vehicle to the second position (i.e., generally centrally located in the guide rail 220). The first and second arms 250,254 are slightly raised as the guide pins 294,296 are moved from the first guide position area 310, through the first inclined area 320, and to the second guide pin position area 312. The forward frame member 194 including the forward roof panel 190 can be pivoted upward about the first hinge members 206; although this is not required. The rear frame member 196 including the rear roof panel 192 is pivoted upward about the second hinge member 210.

As depicted in FIG. 7, in the full-open position of the panoramic roof assembly 114, the drive carriage is moved to the third position (i.e., the drive carriage is located at the forward end portion 234 of the guide rail 220). The first and second arms 250,254 are raised as the guide pins 294,296 are moved from the second guide position area 312, through the second inclined area 322, and to a first location or forward section of the third guide pin position area 314. The forward frame member 194 including the forward roof panel 190 is pivoted upward about the first hinge members 206, and the rear frame member 196 including the rear roof panel 192 is vertically displaced from the vehicle body 120 via the movement of the first and second arms 250,254 and the second hinge member 210. In the full-open position (shown in FIG. 9), the roof assembly 114 accommodates the sliding hatch 116 below the rear frame member 196 when the sliding hatch is in the slide open position.

As illustrated in FIG. 8, in the final-open position of the panoramic roof assembly 114, the drive carriage 224 is moved slightly back toward the second position. This movement of the drive carriage 224 positions the guide pins 294, 296 in a second location or rear section of the third guide pin area 314 and within the detent 334. Thus, the more the guide pins 294,296 are guided within the cam slots 280,282 from the first guide position area 310 toward the third position area 314 as the drive carriage 224 is moved in the direction of travel of the vehicle within the guide rail 220, the more the first and second arms 250,254 are pivoted upwards relative to the vehicle body 120.

With reference again to FIG. 2, the panoramic roof assembly 114 further includes a drive assembly 350 for moving the drive carriages 224,226 within the guide rails 220,222. The drive assembly includes drive cables 352,354 operably connected to a motor 360 and to the drive carriages 224,226. In the depicted exemplary embodiment, the motor 350 and drive cables 352,354 are positioned adjacent the forward portion of the forward frame member 194; although, it should be appreciated that the motor and drive cables can be located adjacent the rear portion of the rear frame member 196. The motor 360 can be mounted to the vehicle body 120 in a known manner. A position sensor 362 can be associated with the motor 360; although, this is not required. The position sensor can provide a signal to a vehicle electronic control unit (not shown) relating to the operational positions of the panoramic roof assembly 114. As illustrated, the position sensor 362 is spaced from the motor 360. However, it should be appreciated that the position sensor can be internal to the motor, or that in lieu of a position sensor, the motor 360 can be a smart motor adapted to provide the operational positions to the electronic control unit.

Advantageously, the rise-up panoramic roof assembly 114 can be configured to allow the sliding rear hatch 116 to slide underneath the rear roof panel 192. The two-panel panoramic roof assembly 114 is configured to lift up into various open positions relative to the vehicle body 120 rather than sliding back. The panoramic roof assembly includes the forward frame member 194 for holding the forward roof panel 190 and the rear frame member 196 for holding the rear roof panel 192. The forward portion of the forward frame member 194 is hinged to the vehicle body 120. The rear portion of the forward frame member 194 is hingedly connected to the forward portion of the rear frame member 196.

The lift assembly 200 includes the guide rails 220,222 which are secured to the vehicle body 120. Each guide rail 220,222 defines a channel which receives one of the drive carriages 224,226. The drive carriages 224,226 are longitudinally displaced within the guide rails 220,222 via drive cables 352,354, which are operably connected to the motor 360. The longitudinal sides of the rear frame member 196 are connected to the drive carriages 224,226 via the forward lift arms 254,256 and rear lift arms 250,252. The lift arms include the elongated cam slots 280,282 dimensioned to receive the guide pins 294,296 associated with the drive carriages 224, 226. As the drive carriages 224,226 move within the guide rails 220,222, the guide pins 294,296 move within the cam slots 280,282 of the lift arms. This, in turn, moves the forward and rear frame members 194,196 between the closed, tilt-open, full-open, and final-open operational positions.

In the tilt-open position of FIG. 5, the free, rear edge of the rear roof panel 192 is slightly elevated relative to the vehicle roof 120, similar to the tilt mode conventionally found in vehicle sunroofs. The raised positions include the full-open position (FIG. 5) for allowing sliding movement of the hatch 116 between the slide closed position (FIG. 1) and the slide open position (FIG. 9) and the final-open position (FIG. 8) for harboring the hatch 116 in the slide open position. As shown, the full-open position of FIG. 5 can be elevated higher than the final-open position of FIG. 8. In particular, the full-open position can be a maximum open position that allows for easier relative movement (e.g., greater clearances) between the hatch 116 and the rear roof panel 192. The final-open position can be one which facilitates driving of the vehicle 100 when the hatch 116 is moved to the slide open position (e.g., causes less wind drag).

In order to achieve the desired opening height and improve stability of the panoramic roof assembly 114, the lift assembly 200 defines a five-bar linkage by hinging the forward frame member 194 to the rear frame member 196. This provides the motion path and stability in the full-open and final-open positions as well as acting as a wind deflector to prevent wind noise. By creating the five-bar linkage, the panoramic roof 114 can raise up to create the desired open area below to receive the sliding hatch 116. Roof stability is increased in the open positions by adding the additional linkage. Wind noise is reduced and the need for a secondary wind deflector is eliminated because the front roof glass panel rises up and serves this purpose.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A rise-up panoramic roof provided on a roof opening of a body of a vehicle comprising:
   a frame member having a forward portion and a rear portion, the forward portion hingedly connected to the vehicle body, the frame member configured to hold a roof panel; and
   a lift assembly configured to move the frame member between a closed position where the rear portion of the frame member closes the roof opening of the vehicle body and a raised, open position where the frame member is raised from the vehicle body and the rear portion is located above the roof opening, wherein the lift assembly includes:
   a pair of laterally spaced apart first and second guide rails connected to the body and flanking the roof opening,
   a drive carriage slidably received in each of the first and second guide rails, and
   at least one lift arm operably connected to the drive carriage of each of the first and second guide rails and the frame member, the at least one lift arm configured to raise the frame member as the drive carriage of each of the first and second guide rails slides therein,
   wherein the at least one lift arm includes an elongated cam slot and the drive carriage of each of the first and second guide rails includes a guide pin which engages the cam slot of the at least one lift arm, wherein movement of the guide pin within the cam slot of the at least one lift arm moves the frame member between the closed position and the raised, open position.

2. The rise-up panoramic roof of claim 1, wherein the frame member includes:
   a forward frame member hingedly connected to the vehicle body and configured to hold a forward roof panel; and
   a rear frame member hingedly connected to the forward frame member and configured to hold a rear roof panel.

3. The rise-up panoramic roof of claim 1, wherein in the closed position each drive carriage of the first and second guide rails is positioned near a rear portion of the first and second guides rails, the drive carriages being displaced toward a forward portion of the first and second guide rails in the direction of travel of the vehicle to move the frame member to the raised position.

4. The rise-up panoramic roof of claim 1, wherein the at least one lift arm includes a first lift arm articulated on both the drive carriage of each of the first and second guide rails and a rear portion of the rear frame member and a second lift arm articulated on both the drive carriage of each of the first and second guide rails and a central portion of the rear frame member.

5. The rise-up panoramic roof of claim 4, wherein the elongated cam slot is a first elongated cam slot located on the first lift arm and is a second elongated cam slot located on the second lift arm, and wherein each drive carriage of the first and second guide rails includes first and second guide pins which engage the respective first and second cam slots of the respective first and second lift arms, wherein movement of the first and second guide pins within the respective first and second cam slots of the respective first and second lift arms moves the frame member between the closed position and the raised position.

6. The rise-up panoramic roof of claim 5, wherein each of the first and second cam slots of the respective first and second lift arms includes:
   a first guide pin position area, a second guide pin position area, and a third guide pin position area,
   a first inclined area spanning between the first guide pin position area and the second guide pin position area, and
   a second inclined area spanning between the second guide pin position area and the third guide pin position area,
   wherein each guide pin position area defines a position of the frame member relative to the vehicle body, each guide pin position area of the first elongated cam slot of each first lift arm is configured to at least partially retain therein the first guide pin of one of the drive carriages, and each guide pin position area of the second elongated cam slot of each second lift arm is configured to at least partially retain therein the second guide pin of one of the drive carriages.

7. The rise-up panoramic roof of claim 2, wherein the lift assembly together with the hinged connection of the forward frame member to the rear frame member define a five-bar linkage on each lateral side of the frame member which provides stability in the raised position.

8. The rise-up panoramic roof of claim 2, further including a drive assembly including a drive cable operably connected to a motor positioned adjacent a forward portion of the forward frame member and a position sensor associated with the motor, the drive carriages being longitudinally displaced within the first and second guide rails via the drive cable.

9. The rise-up panoramic roof of claim 2, further including a seal secured to the rear frame member.

10. The rise-up panoramic roof of claim 2, wherein the forward frame member includes a forward transverse frame part, and further including at least one first hinge member connected to the transverse frame part for hingedly connecting a forward portion of the forward frame member to the vehicle body; and
   the rear frame member includes a forward transverse frame part, and further including at least one second hinge member connected to the transverse frame part for hingedly connecting a rear portion of the forward frame member to a forward portion of the rear frame member.

11. The rise-up panoramic roof of claim 1 in combination with a sliding rear hatch, the frame member being raised from the vehicle body to the raised position for accommodating the rear hatch below the frame member when the rear hatch is in an open position.

12. A rise-up panoramic roof provided on an opening of a body of a vehicle comprising:
   a forward frame member hingedly connected to the vehicle body and configured to hold a forward roof panel;
   a rear frame member hingedly connected to the forward frame member and configured to hold a rear roof panel; and
   a lift assembly configured to move both the forward frame member and rear frame member between a closed position in which the rear frame member closes the opening of the body and an open position in which the rear frame member is displaced from the vehicle body, the lift assembly including:
   a pair of guide rails secured to the body along lateral edges defining the roof opening,
   a drive carriage slidably received in each guide rail,
   a first lift arm having one end portion articulated on the drive carriage and the other end portion articulated on a rear portion of the rear frame member, and
   a second lift arm having one end portion articulated on the drive carriage and the other end portion articulated on a central portion of the rear frame member, the first and second lift arms being configured to move the forward and rear frame members as the drive carriages are displaced toward a forward portion of the guide rails in the direction of travel of the vehicle.

13. The rise-up panoramic roof of claim 12, wherein the lift assembly is configured to move the forward frame member and rear frame member between the closed position, a tilt position, a full-open position, and a raised, final-open position.

14. The rise-up panoramic roof of claim 13, wherein each of the first and second lift arms includes an elongated cam slot and each drive carriage includes first and second guide pins which engage the cam slots of the respective first and second lift arms.

15. The rise-up panoramic roof of claim 14, wherein each cam slot of the first and second lift arms includes a plurality of guide pin position areas which extend generally parallel to the guide rails, each guide pin position area defining a position of the forward and rear frame members relative to the body.

16. The rise-up panoramic roof of claim 15, wherein each guide pin position area is configured to at least partially retain therein the guide pin.

17. The rise-up panoramic roof of claim 15, wherein a lower guide pin position area is configured to at least partially retain therein the guide pin in a first location corresponding to the full-open position and a spaced apart second location corresponding to the open position.

18. A vehicle having a roof opening selectively closed by a rise-up panoramic roof, comprising:
   a vehicle body structure defining the roof opening;
   a forward frame member hingedly connected to the vehicle body structure and configured to hold a forward roof panel;
   a rear frame member hingedly connected to the forward frame member and configured to hold a rear roof panel; and
   a lift assembly configured to move both the forward frame member and rear frame member between a closed position, a tilt position and an open position in which the rear frame member is vertically raised from the vehicle body structure, the lift assembly including:
   a drive carriage slidably mounted to the vehicle body structure along lateral edges defining the roof opening, and
   a first lift arm and a second lift arm for each drive carriage, each lift arm having one end portion articulated on the drive carriage and the other end portion articulated on the rear frame member, the first and second lift arms being configured to raise the forward and rear frame members as the drive carriages are displaced in the direction of travel of the vehicle,
   wherein each of the first and second lift arms includes an elongated cam slot and each drive carriage includes first and second guide pins which engage the cam slots of the respective first and second lift arms, wherein the lift assembly together with the hinged connection of the forward frame member to the rear frame member define a five-bar linkage on each lateral side of the panoramic roof which provides stability for the panoramic roof in a raised position.

19. The vehicle of claim 18, further including a rear opening defined by the vehicle body structure, the rear opening being selectively closed by a sliding hatch, the rear frame member being raised from the body structure to the raised position for accommodating the sliding hatch below the rear frame member when the sliding hatch is in an open position.

\* \* \* \* \*